(12) United States Patent
Tsirkin

(10) Patent No.: US 10,027,604 B2
(45) Date of Patent: Jul. 17, 2018

(54) IMPLICIT DYNAMIC RECEIVE QUEUE STEERING FOR UNIDIRECTIONAL FLOWS IN VIRTUALIZED SYSTEMS

(71) Applicant: Red Hat Israel, LTD., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 39 days.

(21) Appl. No.: 14/951,360

(22) Filed: Nov. 24, 2015

(65) Prior Publication Data
US 2017/0149698 A1    May 25, 2017

(51) Int. Cl.
*H04L 12/28* (2006.01)
*H04L 12/861* (2013.01)
*G06F 9/455* (2018.01)

(52) U.S. Cl.
CPC .......... *H04L 49/90* (2013.01); *G06F 9/45558* (2013.01); *G06F 2009/45595* (2013.01)

(58) Field of Classification Search
CPC ............. G06F 9/45533; G06F 9/45541; G06F 9/45545; G06F 9/45554; G06F 9/45558; G06F 3/0659; G06F 5/065; G06F 5/10; G06F 5/12; G06F 5/16
See application file for complete search history.

(56) References Cited

U.S. PATENT DOCUMENTS

| | | | |
|---|---|---|---|
| 8,018,961 B2 * | 9/2011 | Gopinath | H04L 49/901 370/412 |
| 8,023,528 B2 * | 9/2011 | Hendel | G06F 15/17375 370/463 |
| 8,155,135 B2 | 4/2012 | Aloni et al. | |
| 8,238,250 B2 * | 8/2012 | Fung | H04L 41/5025 370/230 |

(Continued)

FOREIGN PATENT DOCUMENTS

EP    2014028    11/2010

OTHER PUBLICATIONS

Michael S. Tsirkin, "[PATCHv5] virtio-spec: virtio network device RFS support," Dec. 3, 2012, p. 1-7, http://lists.linuxfoundation.org/pipermail/virtualization/2012-December/022191.html, accessed, Nov. 24, 2015.

(Continued)

*Primary Examiner* — Alvin Zhu
(74) *Attorney, Agent, or Firm* — Lowenstein Sandler LLP

(57) ABSTRACT

A system and method are disclosed for steering incoming packets to receive queues of virtual machines (VMs). In one embodiment, a hypervisor executed by a processing device receives an incoming packet for a VM, where the incoming packet identifies an incoming flow to the VM. The hypervisor determines that a data store has no entries for the incoming flow and indicates to the VM that the data store has no entries for the incoming flow. The hypervisor receives an outgoing packet from the VM identifying a first (Continued)

receive queue and obtains from the outgoing packet an incoming flow identifier that identifies the incoming flow The hypervisor stores in the data store an entry associating the incoming flow identifier with the first receive queue. The hypervisor receives a second incoming packet for the VM specifying the incoming flow identifier, and the second incoming packet is inserted into the first receive queue in view of the data store.

19 Claims, 4 Drawing Sheets

(56) References Cited

U.S. PATENT DOCUMENTS

| | | | |
|---|---|---|---|
| 8,644,157 | B2 | 2/2014 | Jagadeeswaran et al. |
| 8,787,154 | B1 | 6/2014 | Medved et al. |
| 8,824,274 | B1 | 9/2014 | Medved et al. |
| 8,873,550 | B2 | 10/2014 | Mital et al. |
| 9,602,421 | B2 * | 3/2017 | Koponen ................ H04L 47/50 |
| 2009/0213732 | A1 | 8/2009 | Veal et al. |
| 2010/0100890 | A1 | 4/2010 | Dar et al. |
| 2010/0169501 | A1 | 7/2010 | King et al. |
| 2010/0232443 | A1 | 9/2010 | Pandey |
| 2010/0272111 | A1 | 10/2010 | Kini et al. |
| 2011/0087774 | A1 | 4/2011 | Pope et al. |
| 2011/0179416 | A1 | 7/2011 | Patale et al. |
| 2011/0252419 | A1 | 10/2011 | Cardona et al. |
| 2011/0274110 | A1 | 11/2011 | Mmmadi et al. |
| 2012/0331250 | A1 | 12/2012 | Nelson |
| 2013/0100960 | A1 * | 4/2013 | Tsirkin ................ H04L 47/50 370/412 |
| 2013/0104124 | A1 | 4/2013 | Tsirkin et al. |
| 2015/0370586 | A1 * | 12/2015 | Cooper ............... G06F 9/45533 710/308 |

OTHER PUBLICATIONS

T. Herbert, "Generic UDP Encapsulation," Dec. 20, 2013; p. 1-17, https://tools.ieft.org/html/draft-herbert-gue-00, accessed, Nov. 24, 2015.

"Scaling in the Linux Networking Stack," p. 1-8, https://www.kemel.org/doc/Documentation/networking/scaling.txt, accessed, Nov. 24, 2015.

Isaac J. Dooley, "Intelligent Runtime Tuning of Parallel Applicationswith Control Points," Dissertation, 2010, p. 1-172, University of Illinois at Uraban-Champaign.

* cited by examiner

129

| VM Identifier | Incoming Flow Identifier | Receive Queue Identifier |
|---|---|---|
|  |  |  |
|  |  |  |
| ⋮ | ⋮ | ⋮ |
|  |  |  |

FIG. 3

IMPLICIT DYNAMIC RECEIVE QUEUE STEERING FOR UNIDIRECTIONAL FLOWS IN VIRTUALIZED SYSTEMS

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which:

FIG. 3 depicts an illustrative queue-steering table for a virtualized system, in accordance with an embodiment of the present disclosure.

DETAILED DESCRIPTION

Figure 1:
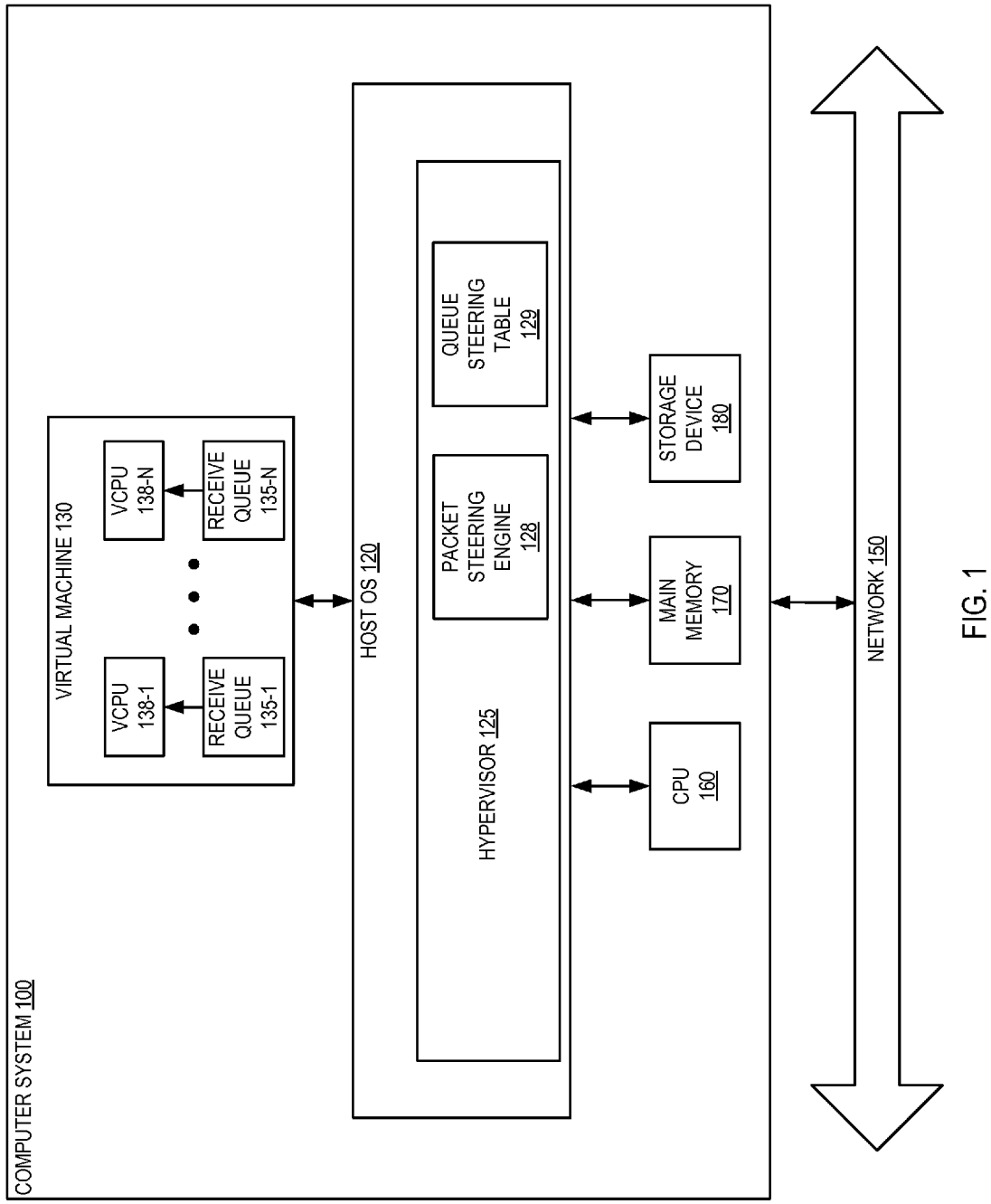
FIG. 1 depicts an illustrative computer system architecture, in accordance with an embodiment of the present disclosure.

By employing multiple receive queues and multiple virtual processors in a virtual machine (VM), a VM can execute network-related programs (e.g., a networking protocol stack, a networking-based application, etc.) in parallel. Aspects of the present disclosure take advantage of this parallelism and provide good performance by steering incoming packets to receive queues of VMs dynamically and intelligently (e.g., taking into account the workloads of various programs executed by the VM, etc.). In particular, a hypervisor on a host machine may maintain a data store (e.g., a table, a file, etc.) associating incoming flows with receive queues for each virtual machine (VM) on the host machine. An incoming flow to a VM refers to a sequence of related packets that are transmitted to the VM from a particular source (e.g., a database server, an application server, etc.). A receive queue refers to a queue of the VM in which incoming packets to the VM are inserted. In some examples, a receive queue may be associated with a virtual network interface card (VNIC) device that is part of the VM. The hypervisor may receive an incoming packet for a VM that has a plurality of receive queues. In some examples, the VM may also have a plurality of virtual processors, where each receive queue is mapped to one of the virtual processors, possibly in a one-to-one fashion or in a many-to-one fashion. The incoming packet may identify an incoming flow, and the hypervisor may determine that the data store associating incoming flows with receive queues has no entries for the particular VM/incoming flow pair, and in response may indicate to the VM that the data store has no entries for the VM/incoming flow.

The hypervisor may then receive from the VM an outgoing packet that identifies the incoming flow and an appropriate receive queue of the VM for that incoming flow, and store an entry in the data store associating the VM and incoming flow identifier with the appropriate receive queue.

The hypervisor may subsequently receive a second incoming packet for the VM whose header specifies the incoming flow identifier, and in view of the data store, insert the second incoming packet into the appropriate receive queue of the VM.

In some examples, the VM may have a single transmit queue, while in some other examples, the VM may have a plurality of transmit queues in addition to a plurality of receive queues. A transmit queue refers to a queue of the VM in which outgoing packets from the VM are inserted for transmission to another entity (e.g., another computer, another virtual machine, etc.). In some examples, a transmit queue may be associated with a virtual network interface card (VNIC) device that is part of the VM. When the VM has a plurality of transmit queues, each of the transmit queues is mapped to a respective receive queue of the VM (not necessarily in a one-to-one fashion), and the appropriate receive queue may be identified implicitly by the particular transmit queue on which the first outgoing packet of the flow is transmitted. For example, if the VM has five receive queues and five transmit queues, the VM may transmit the first outgoing packet on the fourth transmit queue to indicate that subsequent incoming packets for that particular flow should be steered to the fourth receive queue.

Aspects of the present disclosure thus provide a mechanism for steering packets to VMs in a dynamic and efficient manner. In contrast, in approaches of the prior art, such steering is typically done either in a static and inflexible fashion, or is done dynamically via a device driver that executes additional commands and adds overhead.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.) that serves as a secondary memory, connected by a bus 190 (e.g., a Peripheral Component Interconnect [PCI] bus, a Universal Serial Bus [USB}, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120 that manages the hardware resources of the computer system and that provides functions such as interprocess communication, scheduling, virtual memory management, and so forth. In some examples, host operating system 120 also comprises a hypervisor 125 that provides a virtual operating platform for VM 130 and manages the execution of VM 130.

VM 130 is a software implementation of a machine that executes programs as though it were an actual physical machine. As shown in FIG. 1, VM 130 comprises a plurality of receive queues 135-1 through 135-N for receiving incoming packets, where N is an integer greater than one, and N virtual processors 138-1 through 138-N (abbreviated as VCPUs in FIG. 1), where each virtual processor 138-$i$ is software that emulates a physical processor and manages receive queue 135-$i$. It should be noted that in some other examples, the number of virtual processors may be different than the number of receive queues, in which case a virtual processor may handle a plurality of receive queues. It should further be noted that although, for simplicity, a single VM is depicted in FIG. 1, in some other embodiments computer system 100 may host a plurality of VMs.

When VM 130 is added to the computer system 100, VM 130 communicates the number of its receive queues and transmit queues to hypervisor 130, which stores this information. Hypervisor 130 maintains a queue-steering data store (e.g., queue steering table 129 depicted in FIG. 1, a queue steering file, etc.) that associates incoming flows to a VM with a receive queue(s) of the VM. Initially, the queue-steering table may not contain any entries for VM 130. With time, hypervisor 130 can populate the queue-steering table based on information received from VM 130, and then use it to steer incoming packets to appropriate receive queues (e.g., preferred queues for certain types of incoming flows, etc.). An illustrative queue steering table is described below with respect to FIG. 3.

In accordance with one example, hypervisor 125 includes a packet steering engine 128 that is capable of performing lookups of the queue-steering table that associates incoming flows to a VM with a receive queue(s) of the VM, of writing to the queue-steering table, of indicating to a VM that the queue-steering table does not contain an entry for the particular incoming flow to the VM, and of inserting incoming packets into appropriate receive queues, as described below with respect to FIG. 2. It should be noted that in some other examples, hypervisor 125 may be external to host OS 120, rather than embedded within host OS 120.

Figure 2:
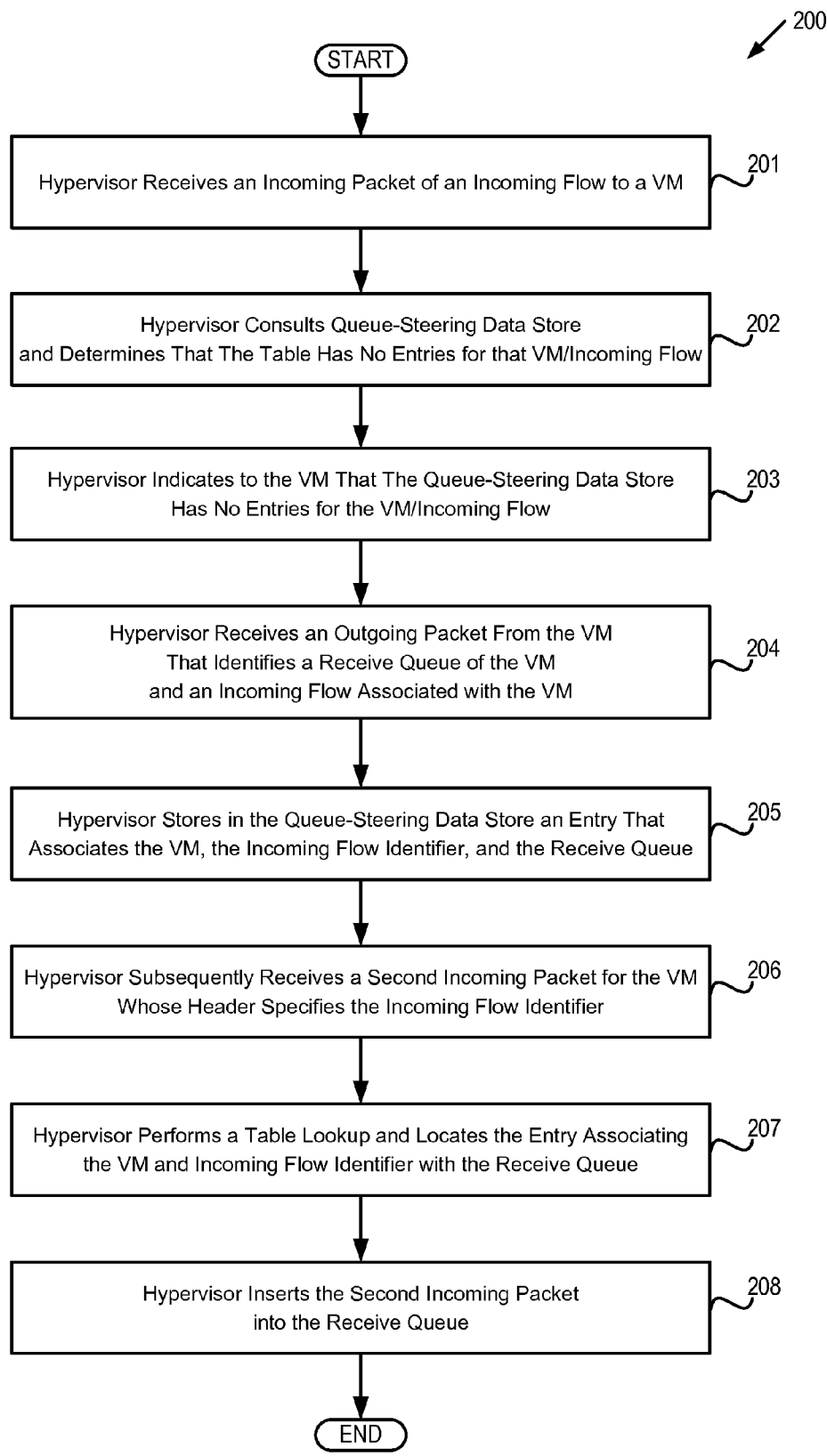
FIG. 2 depicts a flow diagram of one example of a method by which a hypervisor steers incoming packets to receive queues of virtual machines.

FIG. 2 depicts a flow diagram of one example of a method 200 by which a hypervisor steers incoming packets to receive queues of virtual machines. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1. It should be noted that in some embodiments blocks depicted in FIG. 2 may be performed simultaneously or in a different order than that depicted.

At block 201, hypervisor 125 receives a first incoming packet of an incoming flow to VM 130. At block 202, hypervisor 125 consults queue-steering table 129 and determines that the table has no entries for the VM/incoming flow. An illustrative queue-steering table 129 is shown in FIG. 3, in accordance with an embodiment of the present disclosure. In one example, queue-steering table 129 can store flow-to-queue mappings for a plurality of virtual machines, and each virtual machine can have a plurality of table entries, mapping concurrent incoming flows for the VM to different receive queues of the VM.

At block 203, hypervisor 125 indicates to VM 130 that queue-steering table 129 has no entries for that particular incoming flow to VM 130. In some examples, hypervisor 125 may set a flag to indicate to VM 130 that the queue-steering table has no such entries. In some implementations, hypervisor 125 may forward the incoming packet to one of receive queues 135 (e.g., a randomly selected receive queue, a default receive queue, etc.) of VM 130. In one example, VM 130 might have a special receive queue that is reserved for this indication (in other words, whenever VM 130 receives an incoming packet on this special receive queue, VM 130 knows that queue-steering table 129 has no entries for that particular incoming flow to VM 130). In one embodiment, blocks 202 and 203 are performed by packet steering engine 128.

At block 204, hypervisor 125 receives an outgoing packet from VM 130, where VM 130 has identified in the outgoing packet an appropriate receive queue of the VM for subsequent incoming packets of the particular incoming flow identifier. In one embodiment, the incoming flow identifier specifies at least one of an Ethernet address, an Internet Protocol (IP) address, or an IP port number.

In some examples, the appropriate receive queue may be identified by a queue number (e.g., an index i of a receive queue 135-$i$, etc.), while in some other examples the appropriate receive queue may be identified by an address. In implementations where the receive queue used by hypervisor 125 is a special receive queue as described above, the appropriate receive queue is always different than the receive queue used by hypervisor 125, while in some other implementations, the appropriate receive queue might be different than the receive queue used by hypervisor 125, or might be the same as the t receive queue used by hypervisor 125.

In some examples, one or both of the appropriate receive queue identifier and the incoming flow identifier may be contained in a header of the outgoing packet. It should be noted that in some implementations, the outgoing packet may have a header with no packet body, or a partial header with no body.

In some implementations in which VM 130 has multiple transmit queues each corresponding to a certain receive queue, VM 130 might identify the appropriate receive queue by a different mechanism than described above. In particular, VM 130 may identity the appropriate receive queue by which transmit queue the outgoing packet is transmitted to hypervisor 125. For example, if VM 130 has five receive queues 135-1 through 135-5 and five transmit queues (not depicted in FIG. 1), then transmitting the outgoing packet on the first transmit queue would signal to hypervisor 125 that the appropriate receive queue is 135-1, while transmitting the outgoing packet on the second transmit queue would signal to hypervisor 125 that the appropriate receive queue is 135-2, and so forth. It should be noted that in such implementations, the number of transmit queues is not necessarily the same as the number of receive queues.

In some implementations, VM 130 may also set a flag that indicates to hypervisor 125 that forwarding of the outgoing packet is unnecessary. In some examples, the flag may be contained within the outgoing packet (e.g., within a header of the outgoing packet, etc.).

In one embodiment, VM 130 has a guest operating system (OS) that is paravirtualized. More particularly, a driver may be loaded within the guest OS or the guest OS may be modified to perform at least one of the following: read the flag that indicates that queue-steering table 200 lacks an entry for VM 130; generate the outgoing packet; and transmit the outgoing packet. It should be noted that in some embodiments the outgoing packet may be transmitted by another entity of VM 130 (e.g., a guest device driver, etc.), rather than the guest OS.

In one embodiment, a flag may be set in the outgoing packet indicating to hypervisor 125 that forwarding of the outgoing packet is unnecessary (e.g., when the outgoing packet is a "dummy packet" whose purpose is solely to inform hypervisor of the appropriate receive queue). In one example, hypervisor 125 detects the flag in the outgoing packet and in response drops the outgoing packet.

At block 205, hypervisor 125 stores in queue-steering table 129 an entry that associates the incoming flow identifier and the appropriate receive queue with an identifier for VM 130. In one embodiment, block 205 is performed by packet steering engine 128.

At block 206, hypervisor 125 receives a second incoming packet for VM 130 whose header includes the incoming flow identifier that was specified in the outgoing packet. At block 207, hypervisor 125 performs a table lookup of queue-steering table 129 and locates the entry associating the incoming flow identifier with the appropriate receive queue. In one embodiment, block 207 is performed by packet steering engine 128. At block 208, hypervisor 125 inserts the second incoming packet into the second receive queue.

Figure 4:
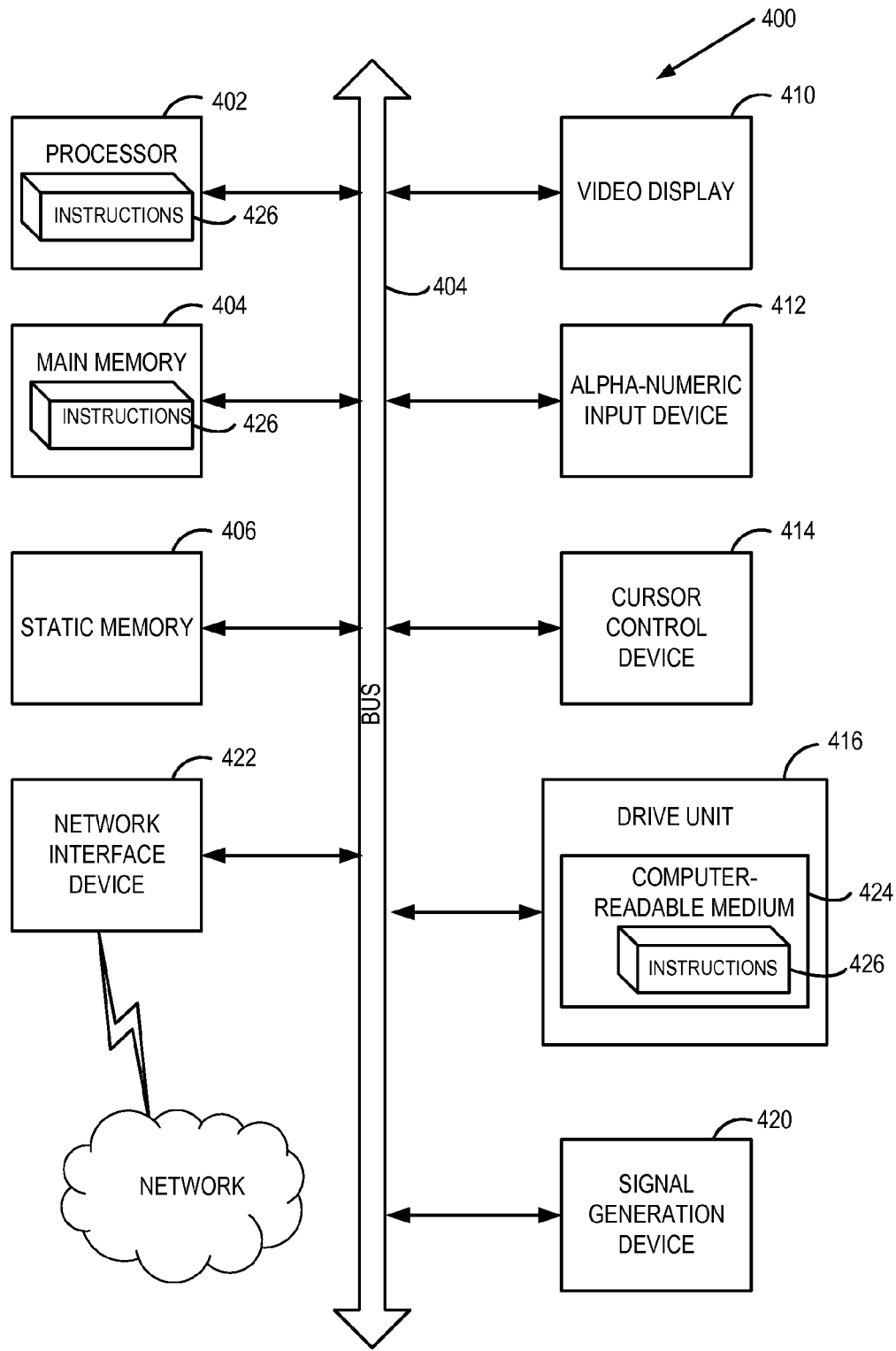
FIG. 4 depicts a block diagram of an illustrative computer system operating in accordance with embodiments of the disclosure.

FIG. 4 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the method of FIG. 2, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "obtaining", "determining", "forwarding", "storing", "inserting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a hypervisor that is executed by a processing device, an incoming packet for a virtual machine that has a plurality of receive queues, wherein the incoming packet identifies an incoming flow to the virtual machine, and wherein each receive queue of the plurality of receive queues comprises a queue to receive one or more incoming packets for the virtual machine;
   determining, by the hypervisor, that a data store associating incoming flows with the plurality of receive queues comprises no entries for the incoming flow;
   indicating to the virtual machine that the data store comprises no entries for the incoming flow;
   receiving by the hypervisor an outgoing packet from the virtual machine that identifies the incoming flow and a first receive queue of the virtual machine;
   obtaining by the hypervisor, from the outgoing packet, an incoming flow identifier that identifies the incoming flow;
   storing in the data store, by the hypervisor, an entry that associates the incoming flow identifier with the first receive queue;
   receiving by the hypervisor a second incoming packet for the virtual machine whose header specifies the incoming flow identifier; and
   inserting the second incoming packet into the first receive queue.

2. The method of claim 1 further comprising forwarding, by the hypervisor, the incoming packet to a second receive queue of the virtual machine.

3. The method of claim 2 wherein the first receive queue and the second receive queue are the same.

4. The method of claim 1 further comprising:
   detecting, by the hypervisor, a flag in the outgoing packet indicating that forwarding of the outgoing packet is unnecessary; and
   in response to the flag in the outgoing packet, dropping the outgoing packet.

5. The method of claim 1 wherein the incoming flow identifier specifies at least one of an Ethernet address, an Internet Protocol (IP) address, or an IP port number.

6. The method of claim 1 wherein the outgoing packet is transmitted by a guest operating system of the virtual machine.

7. The method of claim 1 wherein the first receive queue is identified by at least one of a queue number or an address of the first receive queue.

8. An apparatus comprising:
   a memory to store a data store associating incoming flows with receive queues; and a processing device, operatively coupled to the memory, to:
    execute a hypervisor;
    receive, by the hypervisor, an incoming packet for a virtual machine that has a plurality of receive queues and a plurality of transmit queues, wherein the incoming packet identifies an incoming flow to the virtual machine, and wherein each receive queue of the plurality of receive queues comprises a queue to receive one or more incoming packets for the virtual machine;
    determine, by the hypervisor, that the data store comprises no entries for the incoming flow;
    indicate to the virtual machine that the data store comprises no entries for the incoming flow;
    receive by the hypervisor an outgoing packet from the virtual machine via a transmit queue of the plurality of transmit queues that is associated with a first receive queue of the virtual machine;
    obtain by the hypervisor, from the outgoing packet, an incoming flow identifier that identifies the incoming flow;
    store in the data store, via the hypervisor, an entry that associates the incoming flow identifier with the first receive queue;
    receive by the hypervisor a second incoming packet for the virtual machine whose header specifies the incoming flow identifier; and
    insert the second incoming packet into the first receive queue.

9. The apparatus of claim 8 wherein the processing device is further to forward, via the hypervisor, the incoming packet to a second receive queue of the virtual machine.

10. The apparatus of claim 9 wherein the first receive queue and the second receive queue are the same.

11. The apparatus of claim 8 wherein the processing device is further to:
    detect, via the hypervisor, a flag in the outgoing packet indicating that forwarding of the outgoing packet is unnecessary; and
    in response to the flag in the outgoing packet, drop the outgoing packet.

12. The apparatus of claim 8 wherein the outgoing packet is a header that lacks data.

13. The apparatus of claim 8 wherein the outgoing packet specifies the incoming flow identifier in a header.

14. A non-transitory computer readable storage medium, having instructions stored therein, which when executed, cause a processing device to execute a hypervisor to:
    receive, by the hypervisor, an incoming packet for a virtual machine that has a plurality of receive queues, wherein the incoming packet identifies an incoming flow to the virtual machine, and wherein each receive queue of the plurality of receive queues comprises a queue to receive one or more incoming packets for the virtual machine;
    determine, by the hypervisor, that a data store associating incoming flows with the plurality of receive queues comprises no entries for the incoming flow;
    forward, by the hypervisor, the incoming packet to a first receive queue of the virtual machine that is reserved for indicating to the virtual machine that the data store comprises no entries for the incoming flow;
    receive by the hypervisor an outgoing packet from the virtual machine that identifies a second receive queue of the virtual machine;
    obtain by the hypervisor, from the outgoing packet, an incoming flow identifier that identifies the incoming flow;
    store in the data store, by the hypervisor, an entry that associates the incoming flow identifier with the second receive queue;
    receive by the hypervisor a second incoming packet for the virtual machine whose header specifies the incoming flow identifier; and
    insert the second incoming packet into the second receive queue.

15. The non-transitory computer readable storage medium of claim 14 wherein the instructions further cause the hypervisor to:
    detect a flag in the outgoing packet indicating that forwarding of the outgoing packet is unnecessary; and
    in response to the flag in the outgoing packet, drop the outgoing packet.

16. The non-transitory computer readable storage medium of claim 14 wherein the incoming flow identifier specifies at least one of an Ethernet address, an Internet Protocol (IP) address, or an IP port number.

17. The non-transitory computer readable storage medium of claim 14 wherein the outgoing packet is transmitted by a guest operating system of the virtual machine.

18. The non-transitory computer readable storage medium of claim 14 wherein the second receive queue is identified by at least one of a queue number or an address of the second receive queue.

19. The non-transitory computer readable storage medium of claim 14 wherein the outgoing packet comprises at least a portion of a header, and wherein the at least a portion of the header specifies the incoming flow identifier.

* * * * *